United States Patent [19]

Howery

[11] 3,916,415
[45] Oct. 28, 1975

[54] ANTENNA SCANNING

[75] Inventor: Richard W. Howery, Haddonfield, N.J.

[73] Assignee: RCA Corporation, New York, N.Y.

[22] Filed: Sept. 28, 1950

[21] Appl. No.: 187,268

[52] U.S. Cl. ............... 343/754; 343/766; 343/768; 343/783
[51] Int. Cl.² ........................................ H01Q 19/06
[58] Field of Search ........ 250/33.63; 343/10, 5, 9.5, 343/763, 766, 768, 777, 854, 754, 762, 771, 783

[56] References Cited
UNITED STATES PATENTS

| 2,408,825 | 10/1946 | Varian | 343/765 |
|---|---|---|---|
| 2,436,380 | 2/1948 | Cutler | 343/777 |
| 2,468,751 | 5/1949 | Hansen | 343/765 |
| 2,480,181 | 8/1949 | Breen | 343/768 |
| 2,480,208 | 8/1949 | Alvarez | 343/854 |
| 2,512,139 | 6/1950 | Cady | 343/767 |
| 2,521,844 | 9/1950 | Gordy | 343/777 |
| 2,526,314 | 10/1950 | Alexanderson | 343/761 |
| 2,546,970 | 4/1951 | Busignies | 343/10 |
| 2,571,129 | 10/1951 | Hansen | 343/766 |
| 2,688,744 | 9/1954 | Sunstein | 343/777 X |

*Primary Examiner*—M. R. Wilbur
*Attorney, Agent, or Firm*—Edward J. Norton; Robert L. Troike

EXEMPLARY CLAIM

3. An antenna system comprising an entire antenna assembly for establishing a directive electromagnetic energy pattern, a first means for rotating said assembly in its entirety about one axis thereby to scan 360° about said axis at an angular rate, a second means for scanning repetitively about the same axis at the same angular rate sectors of said 360° scan but in the reverse direction of said first scan, and third means simultaneously to operate said first and second means, whereby said pattern scans in steps.

15 Claims, 6 Drawing Figures

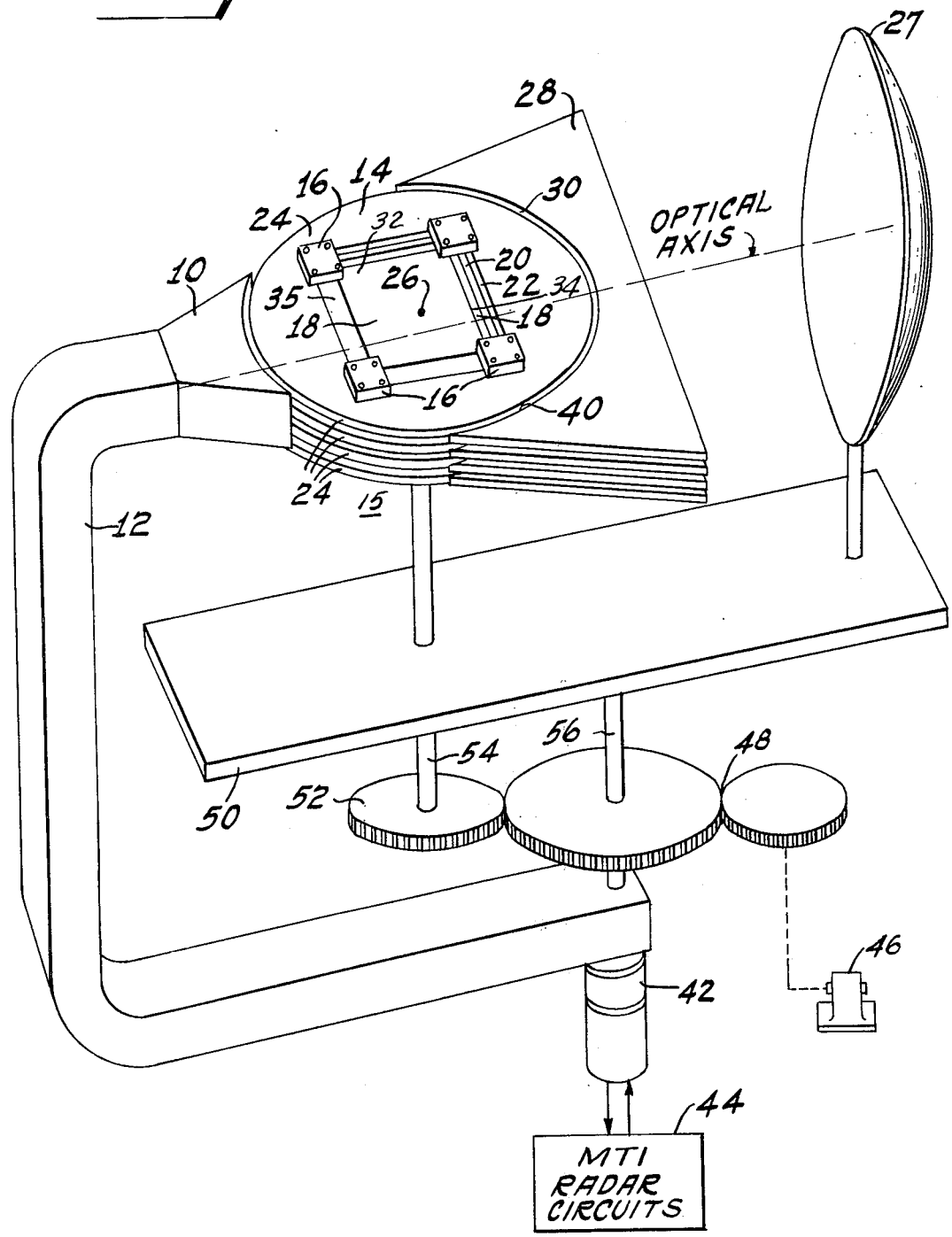

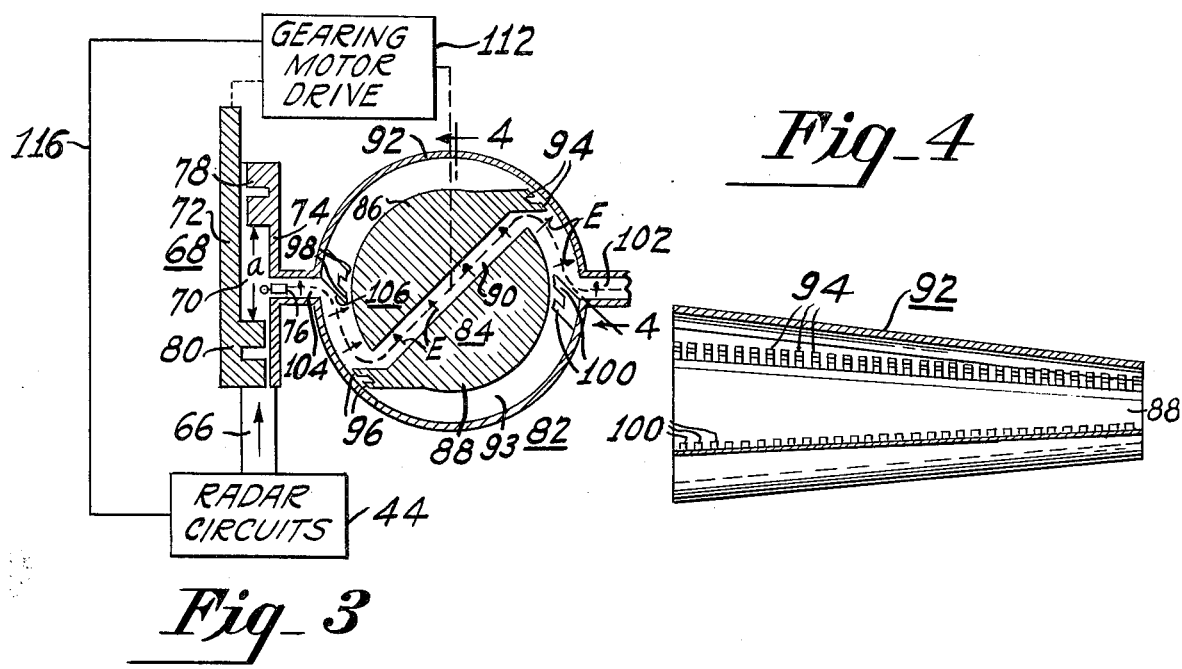
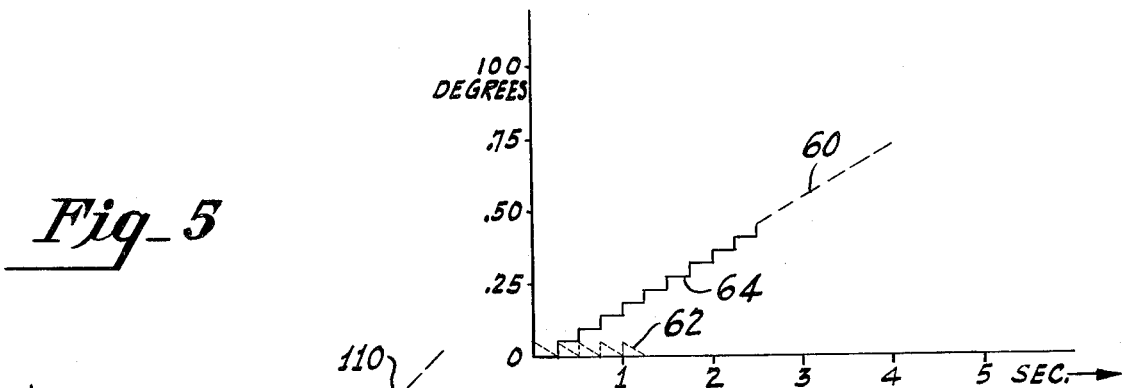
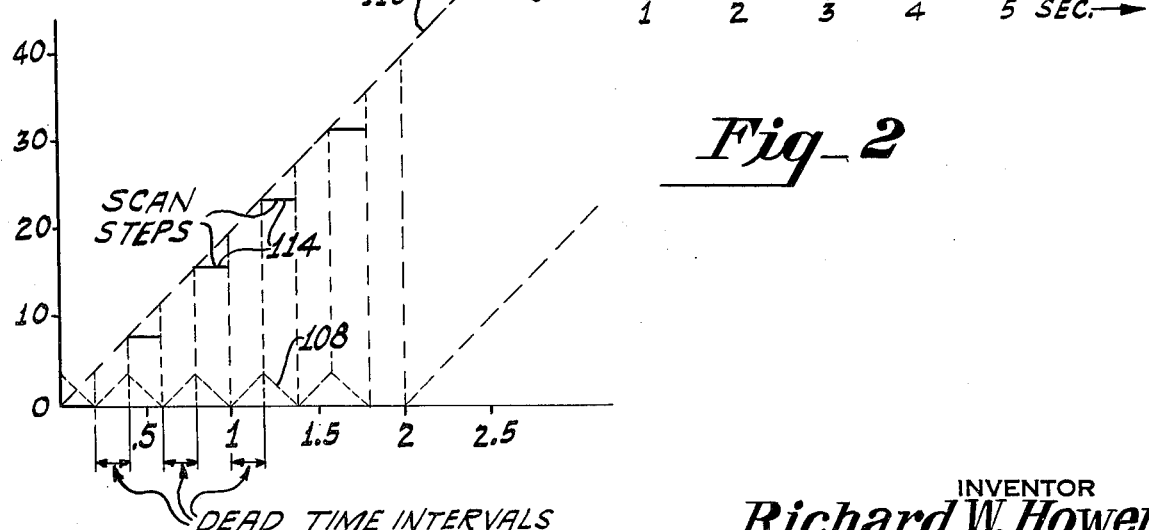

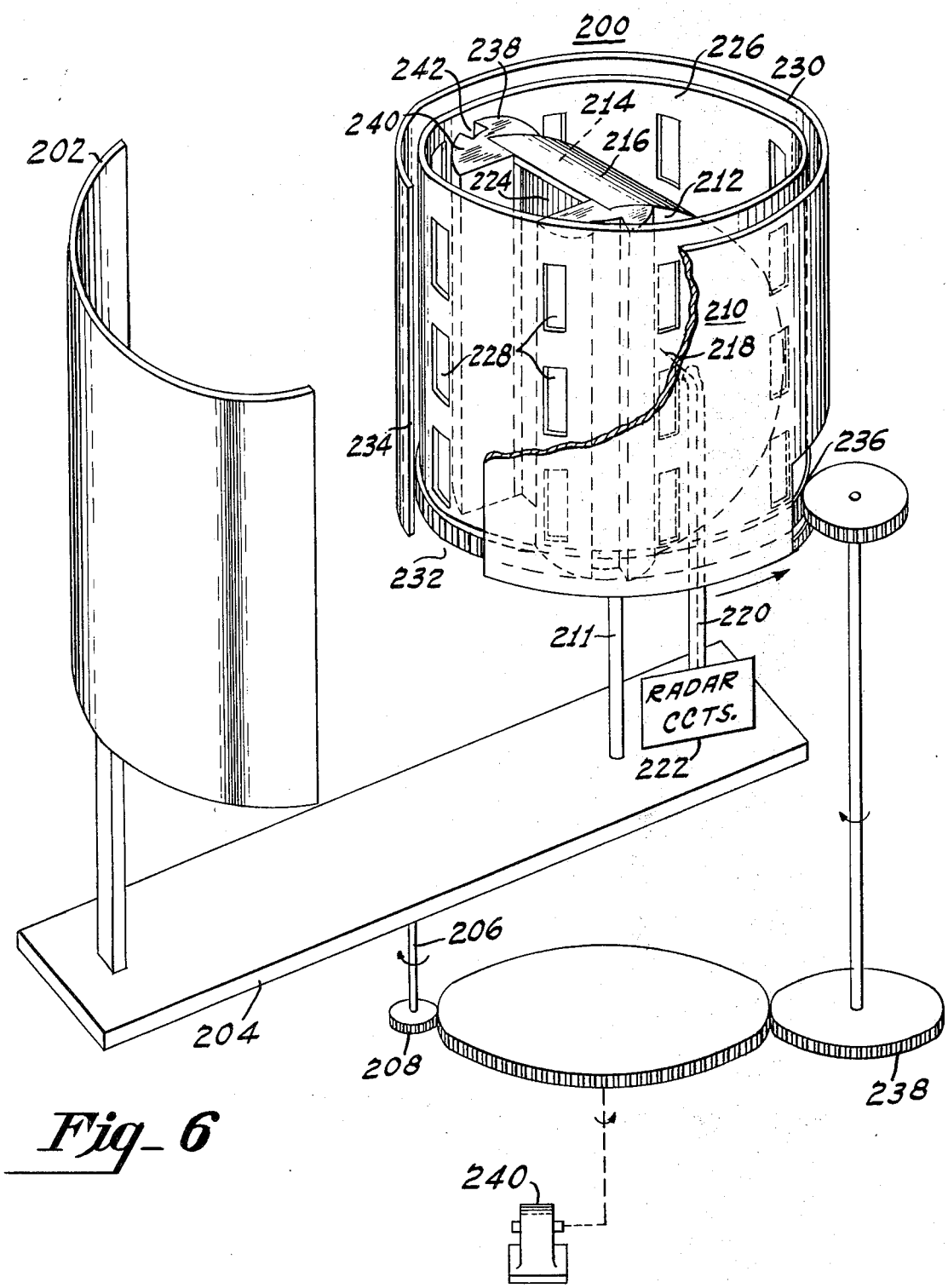
Fig_6

ANTENNA SCANNING

The present invention relates to antenna scanning methods and apparatus.

Moving target indicator (MTI) radar systems are discussed generally in various published works, for example, in chapter 21 of MICROWAVE RECEIVERS, edited by Van Voorhis, volume 23 of the Radiation Laboratory Series, and in the same series, in volume 1, chapter 16 of RADAR SYSTEM ENGINEERING, edited by Ridenour. An MTI system is also disclosed in the copending application of John Collard, filed Apr. 3, 1946, Ser No. 659,196, entitled "Obstacle Detection System," now Pat. No. 2,591,919. One of the vexatious problems associated with MTI systems is the removal of socalled "clutter". It can be verified experimentally, whatever may be the reason, that if the radiation pattern of the radar (radio echo detection and ranging) MTI system is fixed in space, the clutter effects are much minimized. This minimizing effect may be due to the fact that those variations in the strength of the reflected energy which are due to the variations in the strength of the antenna energy pattern are absent; it may also be due to a quantizing effect, that is, to the fact that several successive reflections may be compared without any other change than that due to the motion of a moving target in the field. When the beam scans in the usual fashion with a continuous motion across the field of scansion, the clutter seems to be emphasized. This emphasis is probably due to the fact that the returned signal has a variation in strength which is due to the different beam strengths at different points of the beam as it sweeps across the target. Thus different strengths of the return signal result from the motion of the energy pattern of the antenna with respect to the target. Thus the target may be located at a point where the energy pattern is maximum at one moment and a moment later, as the antenna swings through the sector which the target is located, the target may be at a point with respect to the antenna pattern at which the pattern is reduced by some fractional part of the maximum. The discussion at section 16.7, page 644 of the above-mentioned RADAR SYSTEM ENGINEERING discusses clutter and fluctuations in signal due to scanning motion of the antenna pattern. Were it not for the desirability of narrow beam patterns, a very wide sector might be scanned without beam motion. Unfortunately, a wide beam reduces angular resolution. It is desirable to use a highly directive beam which may be only a matter of a few degrees wide and which covers a large sector of space by scanning over it. The high gain of the antenna obviously reduces the peak power necessary to be transmitted to detect a given target at a given distance. Similar efficiency cannot be derived with broader antenna patterns.

It is an object of the present invention to provide novel apparatus for scanning with electromagnetic energy.

It is a further object of the invention to provide a novel method of scanning with electromagnetic energy.

Another object is to improve the operation of MTI radar systems.

Another object is to reduce the clutter effects in radar systems, and especially in MTI radar systems.

A further object is to improve the sensitivity of MTI radar systems to moving targets.

A further object of the invention is to provide apparatus for scanning a sector of space with an electromagnetic energy pattern by steps.

In accordance with the method of the invention, the field of scan, which may be considered a first or larger sector, is divided into sub-sectors, and this field of scan is scanned step-wise by successively and discretely moving the radiation pattern from one sub-sector to the next adjacent one in the same direction angularly about substantially the same axis until the desired field has been totally scanned. Time during which the system is deliberately inoperative, as by blanking, is not to be considered. Of course, it is preferably that the sub-sectors be scanned without serious overlapping and at the same time without any substantial gaps. Accordingly, the main sector is preferably scanned step-wise with adjacent patterns substantially contiguous. The pattern is preferably established in one sub-sector and then stepped to the adjacent contiguous sub-sector. By stepping, it is meant that the energy is established in one sub-sector and is discontinued after a suitable time of being fixed in that sub-sector and established in an adjacent preferably contiguous sub-sector and so on successively until a desired sector of space has been scanned. The method may be carried into practice with a wide variety of apparatus, some novel examples of which are described herein.

In general, the apparatus according to the invention, includes a first means for scanning the pattern in one direction at a known angular rate, and a second means for scanning the pattern in a reverse direction but at the same angular rate repetitively over smaller sectors than the first sector. By operating both of these means simultaneously the effects of the two means are superimposed and the pattern is caused to step successively through adjacent smaller sectors until the desired larger sector has been scanned step-wise.

The present invention therefore takes advantage of the described reduction of clutter with a fixed beam and includes a method for deriving both those advantages inherent in a system in which the antenna pattern is fixed and a system in which the antenna pattern scans. In other words, clutter effects due to motion of the antenna pattern during detection or radiation of the energy are substantially minimized, thus the benefits of scanning a wide sector with a narrow beam and good resolution are substantially reatined and there is no effective angular motion of the pattern while exploratory pulses are being transmitted.

The foregoing and other objects, advantages, and novel features will be more apparent from the following description when read in connection with the accompanying drawing in which parts which may be the same are designated with like reference numerals and in which:

FIG. 1 is a perspective view partially schematic of one embodiment of the invention, using a lens scanner;

FIG. 2 is a graph helpful in understanding the operation of the embodiment of FIG. 1;

FIG. 3 is a transverse cross-sectional view, partly schematic, of another embodiment of the invention using a cone scanner and a variable width waveguide scanner combined;

FIG. 4 is a longitudinal cross-sectional view of the cone scanner of FIG. 3;

FIG. 5 is a graph helpful in understanding the operation of the embodiment of FIG. 4; and FIG. 6 is a perspective view, partially schematic, of a third embodiment of the invention using still a different type of scanning antenna.

Referring now more particularly to FIG. 1, there is disclosed a scanning system which is similar to that disclosed in the application of William C. Wilkinson, Jr., Ser. No. 171,448, filed June 30, 1950, entitled "Scanning Antenna." This antenna system will be described as though it were radiating energy for reasons of simplicity. It will be understood that it may be used equally well for radiation or reception of energy. A horn antenna 10 may be supplied with energy from a source through a feed waveguide 12. A stack of rotor metallic plates 14 are spaced and held parallel by suitable support, such as dielectric members 16. The rotor plates 14 have aligned polygonal openings 18 with oppositely parallel straight edges, such as 20 and 22. In the illustration, the rectangular polygonal opening is a square. The rotor plates 14 have outer circular edges 24 also aligned. The stacked rotor plates 14 are mounted for rotation about an axis 26 and positioned between antenna 10 and a focusing device such as a lens 27. A further stack 28 of parallel metallic stator plates are fixedly supported by suitable means (not shown) and have circular concave edges 40 closely adjacent and complementary to the rotor circular convex edges 24. The space 30 between rotor plates 14 and stator plates 28 is so small as to result in a negligible effect in refracting or bending rays of energy. The rotor and stator plates 14 and 28 are equally spaced apart and have the same effective index of refraction with the complementary circular edges 24 and 40 placed with the edges substantially in registry to contribute to this result. Of course, the energy refracted by the stacks of plates is polarized with the electric vector parallel to the plates. A dielectric block 32 is supported in the opening 18, preferably by the dielectric members 16, and is spaced from the metallic plates 14 by a quarter-wave space or margin 35. The block 32 thus has plane surfaces such as 34 spaced from the straight edges such as 20 and parallel thereto. The rotor plates 14 and block 32 together thus rotate about axis 26 parallel to the plane surfaces of the block 32. Waveguide 12 may be supplied with energy from or feed energy to the remainder of the radar system which is generally indicated by the block "radar circuits" 44.

Thus far the system corresponds to what is known. The entire antenna assembly, however, as shown is rotated by means of a motor 46 and a gearing 48, the whole being suitably mounted for the purpose as schematically indicated on some base such as 50 and rotated about the axis of a shaft 56. If desired, a rotating joint 42 of any suitable conventional design may be used to maintain the connection between the radar circuits 44 and the feed waveguide 12. The gearing 48 is geared to a gear 52, the shaft 54 of which rotates the rotor assembly 15 of the stacked plates 14 and the dielectric block 32. The two scannings of the pattern caused by the rotation of the entire assembly and by the rotor assembly 15 considered independently is about a substantially common axis. According to the invention, the entire assembly is rotated at a rate which is correlated with the rate of scan of the rotor assembly 15 (which rotor assembly is an element of the entire assembly) to give a stepped scan. For this purpose it is necessary to choose suitably the ratio of the gearings 48, 52. As an example, suppose that the rotor assembly 15 rotates at 60 rpm, and that as each face of the dielectric block 32 turns in front of the waveguide mouth 10 the energy scans in space through a sector of 4°. For simplicity it is here assumed that scanning is continuous between extreme positions of each face of the block 32 in front of the antenna 10. Let us assume at any rate, that the rate of scan is at 4° each quarter second by the rotation of the rotor assembly 15 considered alone. Considering the motion of the antenna assembly as an entirety, it must also scan at a rate of 4° per quarter second in accordance with the invention and in a reverse direction. Each degree of rotation of the entire antenna assembly obviously causes a one degree scan. Accordingly, the entire assembly must scan at a rate of 16° in 1 second and may be considered to scan 360° in 22½ seconds for each revolution, that is, it must rotate at 2⅔ rpm. By so correlating the rates of scan and causing one to be in the reverse angular direction of the other and operating both of the scanning means at the same time, that is, the one for scanning the smaller sectors which comprises the rotor assembly 15 and the one for scanning the larger sector by rotating the entire entenna assembly, it will be apparent that the antenna pattern will step-scan, taking 4° steps, in one angular direction, that is, about a substantially fixed axis. It may be desirable to discontinue the radar system 44 from operation at portions of the scanning period because, as will be understood, at some angles of the dielectric block 32 a radiation pattern may not be established due to internal reflections in the block or the radiation pattern may not scan in the desired directions. Such discontinuance or "dead time" may be accomplished in a simple manner either by blanking circuits or by ceasing to operate the radar transmitter during the desired "dead time" periods, by well known circuits.

Also it is desirable in the system shown in FIG. 1 that the total width in degrees of the radiation pattern should equal the number of degrees of advance of the steps. In other words, the width of the radiation pattern in this example is preferably at least 4° from the customary half power points. If desired, however, the patterns may overlap somewhat so that the pattern may be 5° in width. The patterns are preferably contiguous because otherwise portions of the scanned sector might be entirely missed. Also, the width of such contiguous patterns, it should be noted, is determined primarily by the number of degrees of separation of the steps, and not by the rate of scan of the sub-sector by either of the scan means, nor by the amount of dead time. However, the relative rates of scan must be calculated taking into account if such were the fact for example, that 4° is scanned in intervals between the "dead times," due to motion of the rotor assembly 15. Then the rate of scan would be greater than that here calculated, and suitable correction would be necessary in calculating the proper relation of the gearings.

In the operation of the known MTI radar systems in conjunction with the invention, the resultant stepping motion of the antenna pattern improves the detection of moving targets and the obliteration of fixed targets and clutter. Limitation on receiver action may be less stringent. The present system permits use of indicator circuits in MTI systems heretofore considered as useful only with stationary or very slowly scanning antennas. Another point which may be mentioned is that the entire field of scan may be covered by scanning different parts of the larger sector step-wise in steps during one scan which have their sub-sector centers at different positions from the sub-sector centers of the preceding larger sector scan. As a simple example, the apparatus described could be arranged to scan the 360° sector in steps not an exact multiple of 360°, say in 3 1/7° steps. It is not then as important that antenna patterns of successive steps be contiguous (though contiguity is still ordinarily preferred) since the areas unscanned between sub-sectors, if any, could be scanned on the next scan of the larger sector. Other ratios could also be employed.

Another point to which attention is directed is that sub-sectors are scanned successively in the same angular direction, which means that the successive antenna positions are always disposed clockwise or counter-clockwise with respect to an axis at the antenna system, substantially fixed at least over a substantial number of steps.

The operation of the device which is described may be better understood by reference to FIG. 2 which is a somewhat idealized graph illustrating the relationship between the angular scan rates which would exist if the rotor assembly 15 in FIG. 1 were operated by itself and the entire antenna assembly were operated to rotate by itself without rotation of the rotor assembly 15 and also the result of operating the means for producing the two rotations simultaneously. In FIG. 2, the dotted line 60 represents angle which the center of the antenna pattern would make with some arbitrary reference direction plotted against time as independent variable. The rate of scan illustrated is 2⅔ rpm or 16° per second which is the slope of the line 60. The scan in this instance is angularly uniform with respect to time, which is usually termed linear with respect to time for obvious reasons. The saw-tooth dotted line 62 represents the result which would occur if the rotor assembly 15 were operated by itself. The slope of the inclined portions of the saw-tooth 62 is the negative of that of the line 60. In other words, the line 62 indicates a repetitive scan at the same rate as the scan of the line 60 but in a reverse direction. The results of adding the two operations, that is, the scan indicated by the line 60 and the scan indicated by the saw-tooth 62, is the stepped motion 64 in which for intervals of a quarter second, the antenna pattern remains fixed in direction and is discretely stepped and advances step-wise to scan.

Referring now more particularly to FIG. 3, there is illustrated another embodiment of the invention in which two scanning apparatuses of types different from that in FIG. 1 and different from each other are employed. The radar circuits 44 are connected through a suitable connection shown as a channel 66 to one end of a variable width scanner, sometimes termed an "eagle scanner" 68. A more complete description of the "eagle" type of scanner may be found in section 6.14, chapter 6 of RADAR SCANNERS AND RADOMES, edited by Cady, Karelitz, and Turner, volume 26 of the MIT Radiation Laboratory Series. This is a waveguide scanner in which a motion is imparted to one of the narrow walls of a waveguide, the motion of this element thereby varying the phase velocity in the waveguide. Dipoles or apertures are usually coupled to the waveguide to radiate energy therefrom. If the phase velocity in the waveguide is changed, the relative phase of the radiating elements is changed whereby the scanning angle changes. Referring again to FIG. 3, the scanner 68 has a waveguide 70 having broad walls 72 and 74. In the broad walls 74 are cut apertures or are inserted dipoles suitably spaced and phased which may be fed therefrom, such as dipoles 76. The narrow walls of the waveguide 70 are formed by a choke joint 78 integral with the narrow wall 74 and fixed with respect thereto and a choke joint 80 fixed to the broad wall 72 and integral therewith. The wall 72 and the joint 80 are oscillated up and down as viewed in FIG. 3 by connection from gearing and motor drive 112. This oscillation changes the broad dimension $a$ of the waveguide 70 thereby giving a scanning action to the radiation pattern from the dipoles 76. The choke joints prevent escape of energy even though there is no actual contact between the choke joints 78 and 80 and the opposing walls. The thus scanned pattern is supplied to a second cone scanner 82. The cone scanner 82 is a known type, sometimes called a "Foster" scanner, a longitudinal section thereof being shown in FIG. 4. An inner rotor 84 includes two parts 86 and 88 which in cross-section are substantially semi-circular and divided by a channel 90. The outer stator portion 92 is also substantially circular in inner crosssection. Both the rotor 84 and the stator 92 are in the shape of a truncated cone so that the space or passage 93 between the rotor 84 and the stator 92 is the shell of such a truncated cone, the walls of which are preferably separated by less than a half free space wavelength at the operating frequency. Choke teeth 96 and 94 are provided on the rotor portions 88 and 86 respectively at the entrances or exits (depending on the direction of energy flow) of the channel 90. Similar teeth 98 and 100 are provided diametrically opposite from each other at channels 102 and 104 on the stator 92.

For purposes of explanation, assume for the moment that the rotor 84 is fixed in some such position as illustrated in FIG. 3. The choke teeth 98 are closely spaced so that assuming an energy flow from left to right to enter through the channel 90, with the energy polarized as indicated by the electric vector arrows E, the energy is reflected by the faces 106 of the teeth 98 to follow the circumferential path of the shell between the rotor 84 and stator 92, as indicated by the dotted line. The teeth 96 similarly reflect the energy through the channel 90, the teeth 94 similarly direct it again to follow a circumferential path, and ultimately the teeth 100 direct the energy through aperture 102. The choke slots illustrated in the teeth are preferably a quarter wavelength deep and a quarter wavelength from the reflected faces of the teeth, to give the effect of a short-circuit between the teeth and the opposite stator wall. The teeth are spaced, however, so that the rotor teeth 94, 96 slip between the stator teeth 98, 100 to allow the rotor 94 to be continuously rotated if desired. As the rotor 84 is so rotated, it is apparent that the path of energy through the device 82 is changed because of the conical shape of the device. This change in path length is different for the sections nearer the cone apex of the passage 93 in the shape of a shell of a frustum of a cone and for those sections nearer its larger diameter portions. Accordingly, the energy as it leaves the aperture 102 will scan in a plane normal to that in the view of FIG. 3.

Now according to the invention, the rotation of the rotor 84, one element of the entire assembly and the motion of the scanning member 72, another element, are correlated in such a fashion that the scanning action due to one is at the same rate but repetitively and in a reverse angular direction to that due to the other. In other words, one causes a scan in one angular direction of a certain sector whereas the other scans repetitively at the same rate but in a reverse direction of the other. However, the usual action imparted to a member such as 72 is to drive it up and down as viewed in FIG. 3 which results in a saw-tooth scan in which, however, the rise and fall of the saw-tooth are at the same rate.

Referring to FIG. 5, there is illustrated the scanning action due to each of the scanning apparatuses operated alone and that due to their simultaneous operation. The saw-tooth wave 108 illustrates the angular motion of the antenna pattern due to the motion of member 72 in an up and down direction. Although the scanning may not be strictly linear, it is sufficiently so for illustrative purposes and is here so illustrated. The scanning action due to the scanner 82 operating by itself is indicated by the line 110 and it may be presumed to cover a 40° scan whereas the "eagle" scanner 68 may cover only a 3° sector at each scan. These angles could be interchanged. However, the gearing and motor drive 112 of FIG. 3 is arranged according to the invention so that the scanner 68 repetitively scans a 3° angle in an angular direction the reverse of that scanned by the scanner 82 and at the same rate. Thus when the two scans are added a stepscan results, the scan steps being indicated by the heavier lines 114 of FIG. 4. It will be apparent that there are undesired "dead time" intervals between the desired scans. During these periods the radar circuits are correlated with the gearing and motor drive as indicated by connection 116 of FIG. 3 so that the scanning action is discontinued at least so far as any operator is concerned for that period of time. This may be accomplished by suitably blanking any indicator or by suitably suppressing the transmitter, for these "dead time" intervals. It may be pointed out of course that the scanning steps are separated by 6° intervals. It is obvious therefore, that it is desirable to have a beam width of approximately 6° so that the antenna patterns of the successive steps will be contiguous by which word is included those cases in which there is some overlap. If there is overlap, the patterns are certainly at least contiguous. The "dead time" may be somewhat increased if it is desirable to cut the extremes of the negatively sloped portions of curve 108 or if their slopes are not sufficiently nearly equal to these extremes and opposite in sense to that of the line 110.

Referring now more particularly to FIG. 6, there is illustrated a preferred embodiment of the invention. A scanner assembly 200 is arranged to illuminate a parabolic cylinder reflector 202, the entire assembly being mounted on a base 204 or the like, the base and assembly being rotatable by a shaft 206 connected to a gear 208. The assembly 200 includes a "pillbox" antenna element 210, mounted on a suitable support 211 on base 204. The pillbox 210 includes two parallel sides 212 and 214 and a reflecting preferably parabolic cylinder sheet 216 of metal which joins the sides 212, 214. The pillbox 210 is excited by probe 218 which is coupled to a coaxial line 220. The probe 218 is oriented perpendicularly to the walls 212, 214 substantially at the focal point of the parabolic cylinder reflecting sheet 216. The coaxial line 220 is connected to a radar circuit indicated as 222. In operation of the pillbox 210 during transmission for example, energy is fed through the line 220 to excite the probe 218. Energy from the probe is radiated with the electric vector normal to the sides 212, 214 and is reflected by the sheet 216 to flow out substantially parallel to the axis of the parabola of the plate 216. The reflector 202 is arranged to be illuminated by this energy with the opening 224 of the pillbox 216 substantially along the focal line of the parabolic cylinder reflector 202. Thus far the antenna system described corresponds substantially to a previously known scanning antenna system.

The pillbox 210 is surrounded by a first inner rotatable cylinder 226 which is slotted with sets of slots 228 preferably electrically a half wavelength and thus resonant. Only one of the sets of slots 228 is readily visible in the view of FIG. 6. The inner cylinder 226 is surrounded by a fixed outer cylinder 230 which has a single central longitudinal slot 232, one edge 234 of which is plainly seen in the view of FIG. 5. The slot 232 leaves unobstructed the opening 224 except for the intervention of the inner cylinder 226. In operation, consider first a hypothetical rotation of cylinder 226, the rest of the structure remaining fixed. A set of slots 228 is then carried across the opening 224, by rotation of the inner cylinder 226 which is an element of the entire assembly. Considering the energy here as radiated, the antenna energy pattern resulting will be the same as that of an apparent source at the slots 228 which is moved in the neighborhood of the focal line of the reflector 202. This rotational motion of the inner cylinder or element 226 thus will cause a scanning action in a plane normal to the focal line of the reflector 202. There are 10 sets of slots 228 in the inner cylinder 226 arranged circumferentially to be equally spaced and so that they are just slightly less in separation than the walls 212, 214. In other words, as one set of slots begins to uncover portions of the opening 224 in the rotation of the inner cylinder 226, the adjacent set of slots is just beginning to leave but still leaves portions of the opening uncovered. The reason for this is to avoid violent reflections to the transmitter. In this system, the receiver is blanked during the time both slots uncover the opening. The inner cylinder 226 may be arranged to rotate at 120 rpm or 2 rps. The motion of each set of slots as it passes the opening 224 causes the beam to scan through a 3° angle. Therefore it takes approximately 1/20 of a second to scan a 3° sector, and the scanning rate is substantially 60° per second. The base 204 could be rotated on a shaft 206 independently. The shaft 206 is, however, in accordance with the invention, geared through the various gearings to rotate in a reverse angular direction at 1/6 of a rps. Each degree of rotation of the base 204 causes one degree of rotation of the antenna pattern. Therefore, the rate of scan due to the operation of rotating the base 204 is 60° per second. From what has been said before, it will be apparent that the beam of the antenna pattern of the entire assembly scans in steps of 3°. The antenna assembly is also arranged to have a 3° pattern width between half power points. Thus an entire 360° sector can be scanned in 3° steps somewhat similarly to the manner of scan illustrated in connection with FIG. 1. For convenience of illustration, no top has been shown over the cylinder 230, although one is preferably provided, and the rotatable cylinder 226 may have motion imparted to it through a spider supported in a suitable bearing in the top and driven through the bearing. If so, the space behind the metallic sheet 216 might undesirably resonate, and this space may then be at least partially filled with energy absorbent material applied to the back of sheet 216 to prevent such resonation. The cylinder 230 may be fixed to the base 204 by any suitable means (not shown).

It is apparent that there is disclosed herein a novel method of step-scanning and novel apparatus for carrying into effect the method. The invention provides a highly desirable feature for MTI systems and may also be used for ordinary radar systems.

What is claimed is:

1. In an antenna system for a moving target indicator radar system for intermittently transmitting exploratory pulses in a given directive electromagnetic energy pattern, a first means for scanning said pattern in one direction about an axis over a first sector at one angular rate, and a second means for scanning said same pattern in a reverse direction about the same said axis at the same angular rate repetitively over smaller sectors which are sub-sectors of the first larger sector, said first and second means being simultaneously operable during the transmission of each exploratory pulse, whereby said pattern is scanned in discrete steps and there is no effective angular motion of the pattern while the exploratory pulse is being transmitted.

2. The system claimed in claim 1 said first means comprising means to rotate said entire antenna assembly.

3. An antenna system comprising an entire antenna assembly for establishing a directive electromagnetic energy pattern, a first means for rotating said assembly in its entirety about one axis thereby to scan 360° about said axis at an angular rate, a second means for scanning repetitively about the same axis at the same angular rate sectors of said 360° scan but in the reverse direction of said first scan, and third means simultaneously to operate said first and second means, whereby said pattern scans in steps.

4. The system claimed in claim 3 said third means to operate said first and second means simultaneously including a gearing connecting the said first and second means.

5. An antenna system comprising an entire antenna assembly having a directive electromagnetic energy pattern and having a first movable element of said assembly for scanning said pattern over a sector about an axis, a second movable element of said assembly for scanning said pattern over a second sector which is a sub-sector of the first about the same axis, and means connecting said two elements and relating their motions with the second causing the pattern to scan in the reverse angular direction repetitively but at the same angular rate as the other, whereby said pattern step-scans.

6. The system claimed in claim 5, said first movable element being movable to oscillate.

7. The system claimed in claim 5, said first movable element being movable to oscillate and said second element being rotatably movable.

8. The system claimed in claim 5, the larger sector being an exact multiple of the other sector.

9. The system claimed in claim 5 the larger sector being an exact multiple of the other sector, the said antenna pattern having a width substantially equal to the scanning steps.

10. An antenna system comprising an antenna assembly having a directive electromagnetic energy pattern and having a movable element for repetitively scanning said pattern over a sector less than 360° about an axis, means to impart a rotating motion to the entire assembly for scanning said pattern about the same axis over 360° made up of less sectors, and means relating the two motions whereby the scanning caused by the element is in the reverse angular direction but at the same angular rate as that caused by said rotating motion.

11. The system claimed in claim 9, said element being rotatably movable.

12. The system claimed in claim 10, said assembly having a radiator or receptor with a directive electromagnetic energy pattern, and said movable element comprising a rotatable metallic element surrounding said radiator or receptor and rotatable about it, said metallic element having resonant slots circumferentially spaced whereby the rotation of said metallic element causes an apparent scanning of the pattern.

13. The scanning system claimed in claim 12 said slots being one-half wavelength electrically in a direction normal to the electric vector of the polarization of the energy pattern.

14. The system claimed in claim 13 said slots being circumferentially aligned and sets of said slots being aligned in an axial direction of said element.

15. The antenna claimed in claim 10, comprising a radiator or receptor with said pattern, said movable element being a rotatable metallic element surrounding said radiator or receptor and rotatable about it, and having resonant slots circumferentially spaced whereby the rotation of said metallic element causes said repetitive scanning.

* * * * *